Oct. 5, 1948. S. A. WHITBREAD 2,450,536
ANIMAL TRAP
Filed March 20, 1944
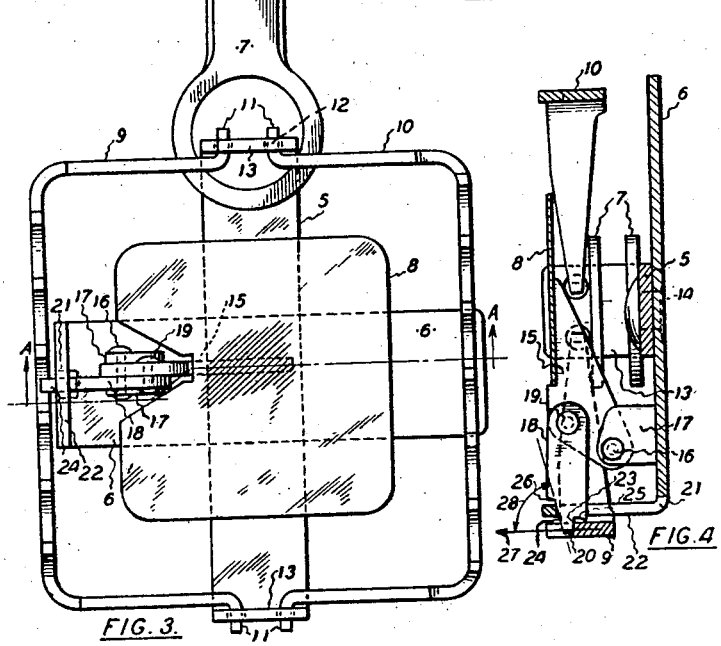
Inventor:
S. A. Whitbread,
By E. F. Wenderoth
Atty Patented Oct. 5, 1948

2,450,536

UNITED STATES PATENT OFFICE 2,450,536

ANIMAL TRAP

Samuel Albert Whitbread, Sydney, New South Wales, Australia, assignor to Anthony Louison, Sydney, New South Wales, Australia Application March 20, 1944, Serial No. 527,228 In Australia May 18, 1943

6 Claims. (Cl. 43—92)

1

This invention relates to traps of the kind consisting of a base having a touch-plate and a pair of U-shaped jaws hinged thereon, a U-shaped leaf spring which is mounted on the base and is able to load said jaws; and catch devices whereby said jaws may be held open against the loading of the leaf spring, and which in response to pressure on the touch-plate release the jaws and thereby enable the leaf spring to effect closure thereof. The invention has been devised to provide such a trap which is more sensitive than those existent heretofore, and which has a degree of self-setting ability such that a user may set the trap with only one hand, and without necessity for touching the jaws, or the catch, or other part of the trap, in that vicinity wherein there exists a dangerous likelihood of a user's hand being caught by premature jaw closure.

In the accompanying drawings—

Figs. 1, 2 and 4 are all sectional end views (taken substantially on line A—A in Fig. 3) showing the trap parts in different positions.

Fig. 1 shows the trap unset and with its jaws closed;

Fig. 2 shows the trap unset and with its jaws wide open;

Fig. 3 is a plan (with the spring—which is of conventional form—partly broken away) showing the trap set; and Fig. 4 also shows the trap set, and turned through 90°, relative to Figs. 1 and 2, for description purposes apparent later herein.

The trap comprises a base consisting of a longitudinal member 5 and a cross-member 6, a spring 7, a touch-plate or "pad" 8, and jaws 9 and 10 whereof the ends 11 are freely rotatable in holes 12 formed in the upturned ends 13 of member 5. These arrangements (numbered 5 to 13) are all more or less in accordance with conventional design, with the exception that an advantage of the construction resides in the placement of the member 5 above the cross-member 6 so that that member 6 is below the level of the remainder of the base and the parts mounted thereon. The members 5 and 6 are joined together by a rivet or the like, and preferably by a flush rivet such as 14, or by welding, or by other means which enable the cross-member 6 to function as a flat lateral support for the base-end of the trap. The lateral stability provided by this preferred arrangement of the base members is of importance in a trap having the sensitivity of the present trap (as described later herein) because the slightest freedom for rocking movement or unsteadiness, when the trap has

2 been set, creates a liability for the merest touch (say by an animal stepping on the spring) to disturb or jar the trap sufficiently to cause premature jaw closure.

The pad 8 is fixed as by welding on a hinge-leaf 15, pivoted on pin 16, to lugs 17 fixed on member 6. A catch 18 is pivoted on pin 19, to the hinge-leaf 15. The free-end 20 of catch 18 projects through an upright slot 21 formed in an upstanding part 22 of the cross-member 6. The part 22 is disposed entirely within the space (in the illustrated arrangement a square space as shown in Fig. 3) bounded by the open jaws, as are all of the parts forming the catch assembly and the pad therewith. This total encompassment of the pad and the catch assembly parts by the open jaws, is an advantageous characteristic of the trap construction, as it means that in the event of an animal disturbing any part of the pad or catch assembly, part of its body is, of necessity, within the ambit of the jaws; also, there is no upwardly movable portion of the assembly which tends to throw the endangered portion of the animal's body clear of the closing jaws.

The free-end 20 of catch 18 has a bottom edge 23 adapted to abut the trap jaw 9, and an inclined or oblique top edge 24 adapted to abut the part 22 at the top end of slot 21, as shown in Fig. 4.

In order that the trap may be self-setting to the extent indicated earlier herein, it is essential that the free-end 20 be constrained at all times to remain projected within the slot 21 without prejudicing required turning freedom about the axis at 19. The necessary constraint is provided by an upstanding abutment which is fixed relative to the base and upon which the catch may freely ride. This abutment, in the preferred embodiment disclosed, is constituted by one of the lugs 17. When the catch is otherwise unsupported, its lower edge rides on the top of the lug 17 (as shown in Figs. 1 and 2) and is thereby prevented from leaving the slot 21.

When the trap is to be set, the trap with its parts disposed as shown in Fig. 1 is taken up by grasping the spring 7 so that it is compressed as shown in Fig. 2. This enables the jaws freely to fall into the position shown in Fig. 2. The trap is then turned towards the position shown in Fig. 4. This causes the pad assembly to fall away from the base 5—6 about the axis at 16. During this movement, the catch, hanging freely about its hinge 19, advances into the slot 21 to the extent shown in Fig. 4. The grasping pressure on the spring is then relaxed so that the jaw 9 moves into abutment with the bottom edge 23 of the free-end 20. The position of the axis at 19 relative to the axis at 16 is of importance in retaining the free-end 20 within the slot 21 and in enabling the catch movement required in connection with trap setting as described above. The positioning of these axes as shown in the drawings (namely, the axis at 19 further from the base 5—6 and further from the part 22 than is the axis at 16) has been found to be satisfactory in a trap conforming with the illustrated arrangements. The edges 23 and 24 of the free-end 20 preferably terminate respectively in steps 25 and 26. These steps, by abutting the jaw 9 and the top portion of the part 22 (as approximately shown in Fig. 4), respectively, limit the extent to which the pad 8 may fall away from the base during setting.

Sensitivity of the trap is mainly due to the inclination of the edge 24 relative to the direction in which (when the trap is set) the jaw 9 exerts pressure on that edge. Referring particularly to Fig. 4, the arrow 27 represents the direction in which the jaw 9 exerts pressure on the free-end 20. The angle indicated at 28, that is, the least angle between the direction of jaw thrust (27) and the inclined top edge 24, is herein called the "thrust" angle. It will be clear that if the thrust angle is imagined progressively to diminish, a limiting condition will eventually arise in which the inclination of the edge 24 is so great that the pressure of the spring-loaded jaw 9, by itself, is sufficient to "set-off" the trap. By making the thrust angle just a little greater than that which gives rise to this limiting condition, a trap of extreme sensitivity may be provided, in which the lightest touch on the pad is sufficient to set it off. Experiment has shown that for a trap which from the viewpoint of a practical user is highly sensitive while just avoiding oversensitivity, a satisfactory thrust angle is somewhat less than a right-angle, for example, from about 80° to 70°. The thrust angle may, of course, be selected in accordance with any required degree of sensitivity, but it is essential that the angle be such as to provide sufficient frictional bearing contact between the edge 24 and the upper end of the slot 21 to ensure that a set trap will remain set in the absence of loading on the pad.

What I claim is:

1. In an animal trap of the character described and including a trap base, openable and closable jaws mounted thereon, and a pad hinge-leaf pivotally mounted relative to said base: a catch assembly comprising an upstanding part of said base which is disposed within the space bounded by the jaws of the trap when in open position and which has an upright slot therein, a catch which is pivotally connected by one end to said hingle-leaf and whereof the free end is adapted to obstruct a trap jaw while projecting through said slot and in contact with the said upstanding part at the upper end of said slot, and means interposed between said upstanding part and the aforesaid one end of said catch and arranged under and in substantial alinement with said catch, said means constituting a limit of movement for said catch and being engageable with the latter while the catch is still in said slot, whereby said free end is constrained to remain within said slot for any position of said catch.

2. In an animal trap of the character described and including a trap base, openable and closable jaws mounted thereon, and a pad hinge-leaf pivotally mounted relative to said base: a catch assembly comprising an upstanding part of said base which is disposed within the space bounded by the jaws of the trap when in open position and which has an upright slot therein, a catch which is pivotally connected by one end to said hinge-leaf and whereof the free end projects into said slot and is capable of limited vertical movement relative thereto, and means whereby said free end is constrained to remain projected into said slot for any position of said catch; said free end being adapted to obstruct a trap jaw by abutment of its bottom edge on said jaw, and by abutment of its top edge against the said upstanding part at the top of said slot, said top edge being inclined relative to the longitudinal axis of said catch to an extent such that when the trap is set the thrust angle defined between the said top edge and said upstanding part, while sufficing to enable the trap to remain set, is less than 90°.

3. Means according to claim 2 in which the axis about which said catch is pivotally connected to said hinge-leaf, is farther from said trap base and farther from the said upstanding part of said base than is the axis about which said hinge-leaf is pivotally mounted and in which the means whereby the free end of the catch is constrained to remain projected into the said slot for any position of the catch is constituted by a further upstanding part on said base constituting an abutment on the upper end of which the lower edge of said catch may ride.

4. Means according to claim 2 wherein the said bottom edge and the said top edge of the free end of the catch, terminate in steps respectively able to abut a jaw of the trap and the said upstanding part of the trap base.

5. Means according to claim 2 wherein the said thrust angle lies within the angular range of from 80° to 70°.

6. Means according to claim 2 in which the axis about which said catch is pivotally connected to said hinge-leaf, is farther from said trap base and farther from the said upstanding part of said base than is the axis about which said hinge-leaf is pivotally mounted, and in which the means whereby the free end of the catch is constrained to remain projected into the said slot for any position of the catch is constituted by a further upstanding part on said base constituting an abutment on the upper end of which the lower edge of said catch may ride, said abutment being one of a pair of lugs on which the said hinge-leaf is pivotally mounted.

SAMUEL ALBERT WHITBREAD.

REFERENCES CITED

The following references are of record in the file of this patent:

UNITED STATES PATENTS

| Number | Name | Date |
| --- | --- | --- |
| 354,599 | Dennis | Dec. 21, 1886 |
| 529,129 | Mead | Nov. 13, 1894 |
| 1,539,103 | Alston | May 26, 1925 |
| 2,020,153 | Melvin | Nov. 5, 1935 |

FOREIGN PATENTS

| Number | Country | Date |
| --- | --- | --- |
| 368,333 | Great Britain | Mar. 1, 1932 |
| 356,860 | Germany | Aug. 4, 1922 |
| 10,451 | Australia | Dec. 7, 1933 |